Nov. 12, 1963  D. W. BONNEY  3,110,275
COMBINED PLANTING MACHINE
Filed March 3, 1961  5 Sheets-Sheet 1

David W. Bonney
INVENTOR.

BY *Clarence A. O'Brien*
and *Harvey B. Jacobson*
Attorneys

Nov. 12, 1963  D. W. BONNEY  3,110,275
COMBINED PLANTING MACHINE
Filed March 3, 1961  5 Sheets-Sheet 2

David W. Bonney
INVENTOR.
BY
Attorneys

Nov. 12, 1963 D. W. BONNEY 3,110,275
COMBINED PLANTING MACHINE
Filed March 3, 1961 5 Sheets-Sheet 3

David W. Bonney
INVENTOR.

David W. Bonney
INVENTOR.

United States Patent Office 3,110,275
Patented Nov. 12, 1963

3,110,275
COMBINED PLANTING MACHINE
David W. Bonney, Box 697, Rte. 2, Callao, Mo.
Filed Mar. 3, 1961, Ser. No. 93,057
2 Claims. (Cl. 111—70)

This invention relates to a novel and useful machine for performing various agricultural operations involved in planting a crop.

The primary object of this invention is to provide a machine which may be readily assembled onto a tractor type vehicle for the purpose of planting seeds in the ground with a tremendous saving in time, labor and expense by performing the various operations associated with the planting of the crop in addition to the deposit of the seeds in the ground, such as plowing, disking, adding weed spray and soil insecticides. All of the aforesaid soil treatments are performed at the proper time in relation to the deposit of the seed by the machine of the present invention, in one operation. As a result thereof not only is there a tremendous saving in time, labor and expense, but as a result of the rapid sequence of the soil treatment in relation to the deposit of seeds within the ground, a superior crop may be produced.

It is therefore another object of this invention, to provide a planting machine which is effective to treat the earth in a most expeditious manner with fertilizer, insecticide and weed killer.

An addition object of this invention is to provide a planting machine which is effective to aerate the soil using a minimum of power and otherwise work the soil prior to deposit of the seeds therein before it dries out.

A still further object of this invention is to provide a planting machine which eliminates separate plowing, disking and harrowing of the earth by performing a complete tillage in one operation.

Another object of this invention is to provide a planting machine which is characterized by the use of spader assemblies which are self-cleaning and self-sharpening and assist in pulling the tractor over the field. In addition, the spader assemblies are designed to be disengaged from the drive in response to overload or engagement with hard and irregular earth.

Another object is to provide a planting machine which is effective to discourage weed growth between row crops by additional spading of the soil between the rows in which the seeds are planted and thereby also effective to leave the field without any tractor tracks. The planting machine of the present invention is also characterized by adjustable spader assemblies capable of being used on hilly terrain for terracing purposes so as to hold moisture and prevent erosion.

In accordance with the foregoing objects, the planting machine of the present invention is adapted to be mounted on a conventional type of tractor vehicle with the machine components being mounted below the tractor chassis and extending laterally therefrom and rearwardly therefrom. The front part of the machine therefore adjustably mounts a pair of spader assemblies which initially till the earth and are adjustable simultaneously both as to depth of penetration and pressure to initially form two planting rows. By adjusting the front pair of spader assemblies relative to each other as to depth of penetration, terracing of hilly terrain may be effected. Following the front spader assemblies and mounted on the same mounting frame, are a pair of cultivator plow members which are effective to clean the spaders and clear the ground in front of a following planter shoe of a planter and fertilizer mechanism also mounted on a common frame with the plow members and that spader assembly. The mounting frame is adjustable simultaneously with each of the spader assemblies. Also, the drive for the spader assemblies are derived from a power take-off from the tractor vehicle and are rendered inoperative in response to upward pivotal displacement of the spader assemblies by uneven ground or by selective control. Mounted rearwardly of the tractor vehicle is a cultivator assembly which includes three spader assemblies similar to the front spader assemblies. The rear spader assemblies are laterally spaced with respect to the front spader assemblies in overlapping relation thereto so that a continuous swath of earth will have been tilled by the planting machine and at the same time remove the tracks of the tractor vehicle as a result thereof. Also, mounted by the planting machine adjacent to each rear spader assembly, are spray dispenser mechanisms provided for the purpose of applying weed killer and insecticide to the soil immediately following the tillage thereof. The rear spader assemblies together with the spray mechanism are selectively controlled for operative engagement with the soil. From the foregoing, it will be appreciated that the planting machine of the present invention in addition to constituting a one operation planting procedure to thereby effect a tremendous savings in time, labor and expense will produce a superior crop, and is also selectively useful for different purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is a partial perspective view of the depth control mechanism for the front spader assemblies.

Figure 1:
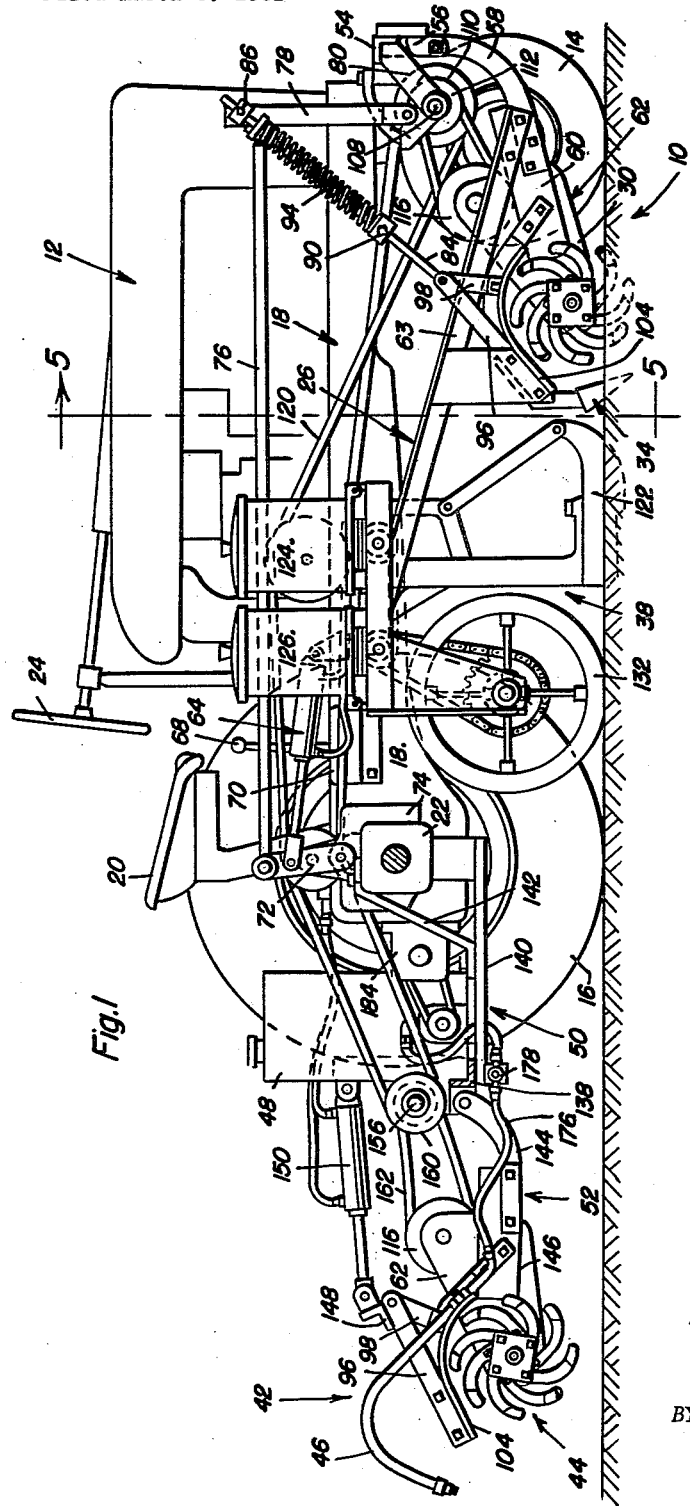
FIGURE 1 is a side sectional view taken substantially through a plane indicated by section line 1—1 in FIGURE 2 showing the planting machine mounted on a conventional type of tractor vehicle.
Figure 2:
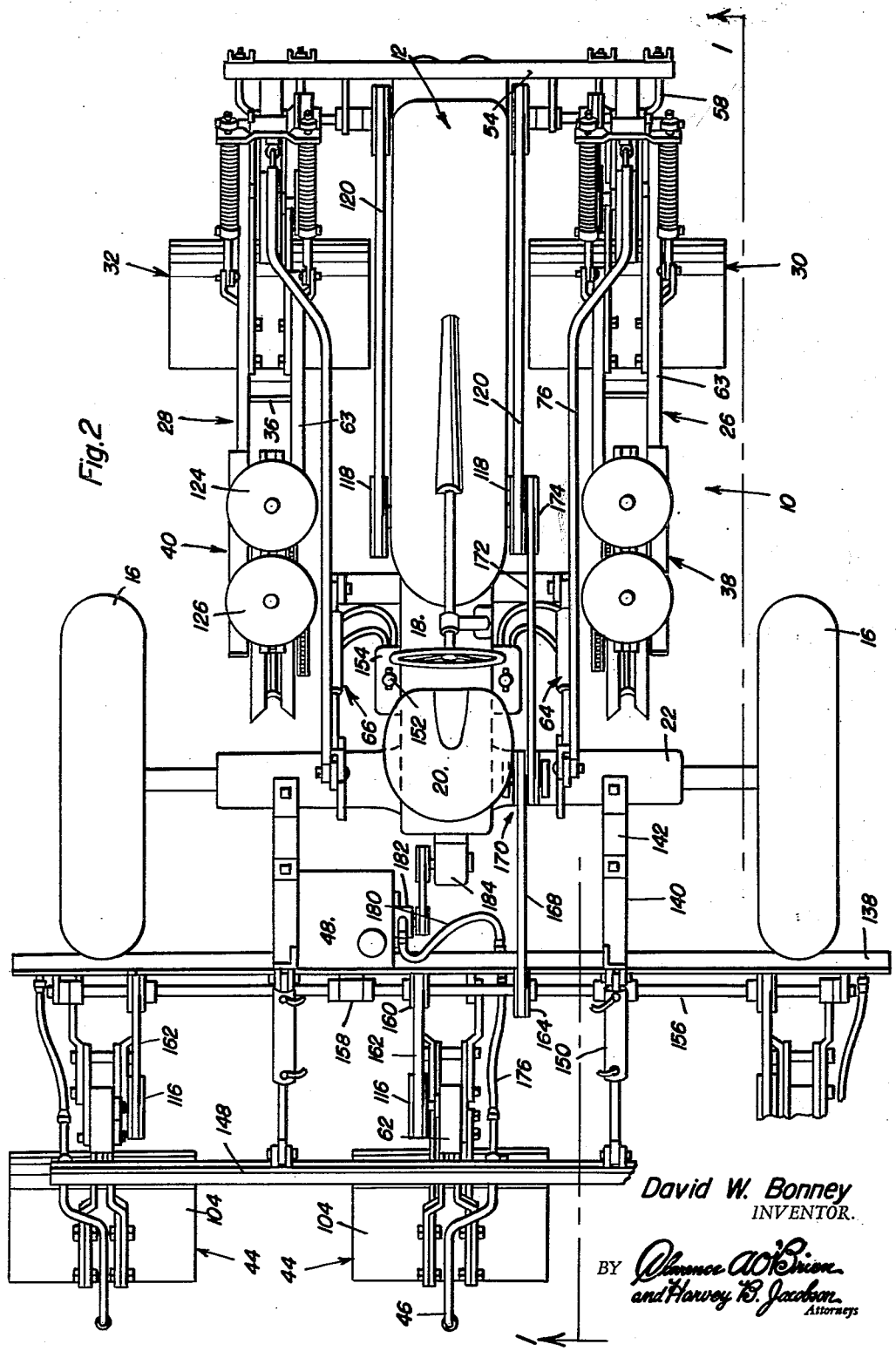
FIGURE 2 is a top plan view of the planting machine of FIGURE 1.
Figure 3:
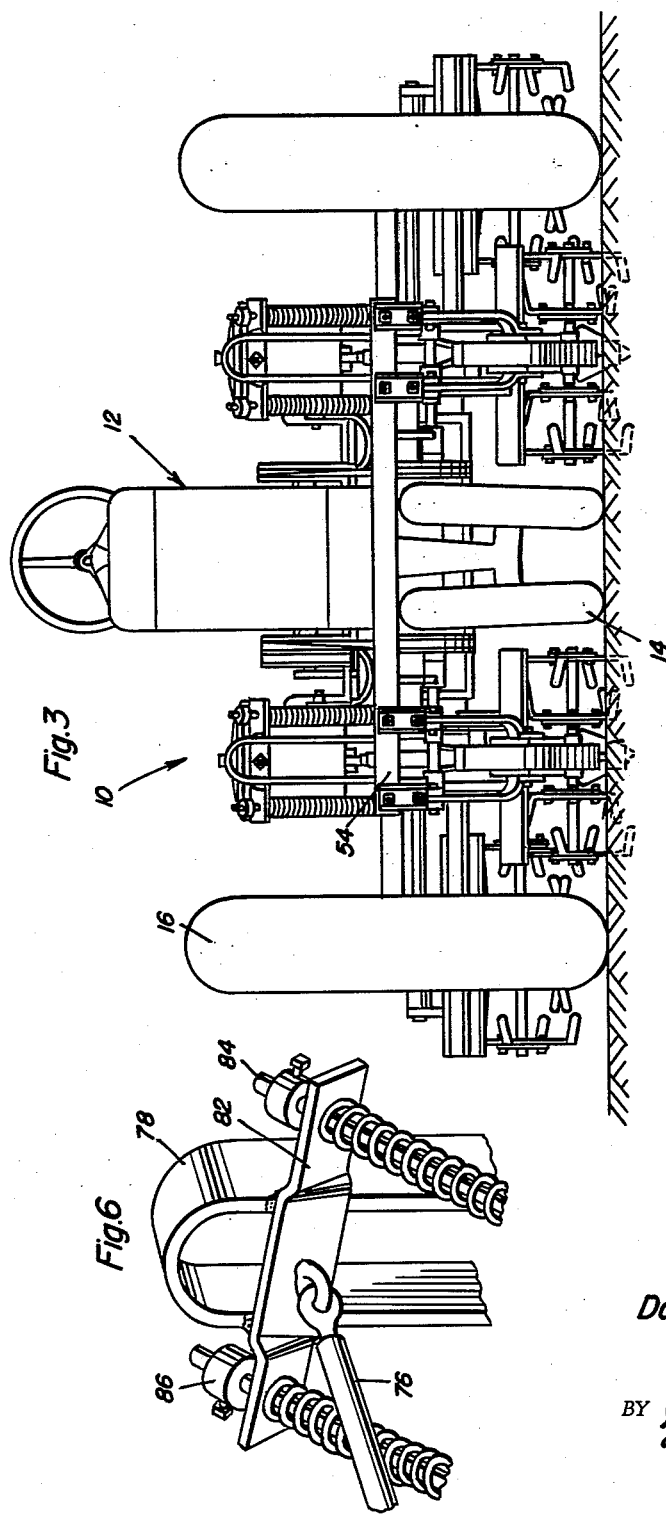
FIGURE 3 is a front elevational view of the planting machine illustrated in FIGURE 2.

Referring now to the drawings in particular, the planting machine which is generally referred to by reference numeral 10 is more completely shown in FIGURES 1, 2 and 3. The planting machine 10 is mounted on a conventional type tractor vehicle generally referred to by reference numeral 12 which includes a pair of front steerable wheels 14 and a pair of rear traction wheels 16. The vehicle 12 includes a chassis frame assembly 18 upon which there is mounted a seat 20 adjacent the rear portion thereof and positioned above the axle tube 22 through which the axle connected to the rear traction wheels 16 extends. A steering wheel 24 is accordingly mounted in front of the seat 20. The planting machine 10 includes a pair of forward frame mounting assemblies 26 and 28 which are disposed on opposite lateral sides of the tractor vehicle 12 and extends from a forward portion of the vehicle rearwardly thereof terminating short of the tractor vehicle axle tube 22. Mounted on the frame mounting assemblies 26 and 28 are a pair of spader assemblies 30 and 32. Disposed rearwardly on the front spader assemblies are a pair of cultivator plow members 34 and 36. Finally, mounted rearwardly of the mounting assemblies 26 and 28 are a pair of planting and fertilizer assemblies 38 and 40. Extending to the rear of the tractor vehicle is a cultivator assembly generally referred to by reference numeral 42 which includes three similar spader assemblies 44 which are disposed in laterally spaced relation and in overlapping lateral relation to the front spader assemblies 30 and 32. The two laterally outermost spader assemblies 44 are also in alignment with the traction wheels 16. It will also be observed that each of the rear spader assemblies 44 has associated therewith a spray nozzle mechanism 46 by means of which weed killer and insecticide may be applied to the soil. The weed killer and insecticide may be derived from reservoir tank 48 mounted on a subframe assembly 50 of the machine 10 to which the selectively positioned frame assembly 52 is pivotally connected for mounting the rear spader assemblies 44 and spray nozzle mechanism 46.

Each of the mounting frame assemblies 26 and 28 are of similar construction and are interconnected to the vehicle by means of a front cross bar 54. Connected to the front cross bar 54 which may be in the form of an angle iron member, are two pair of hinge bracket members 56 disposed on opposite lateral sides of the front cross bar 54 for the purpose of pivotally supporting therefrom the mounting assemblies 26 and 28. Each of the mounting assemblies, therefore includes a pair of rearwardly curved arm members 58 which are pivotally connected to the hinge brackets 56 and are bolted to connecting plate members 60 (FIGURE 4) disposed on the opposite sides of a gear casing 62 for each of the spader assemblies 30 and 32. Also bolted to the connecting plate members 60 and the rearwardly curved arm members 58, are pairs of rearwardly extending angle frame members 63 disposed on opposite sides of the gear casing 62. As will be seen more clearly from FIGURES 1, 4 and 2, the mounting frame assemblies 26 and 28 may accordingly mount the front spader assemblies at the juncture of the frame members 63 and the rearwardly curved arm members 58 while the seed and fertilizer planter assemblies 38 and 40 are supported by the assemblies 26 and 28 at the rear ends of the pairs of frame members 63. The plow members 34 and 36 are therefore positioned between the spader assembly and the planter assembly by means of downwardly depending connecting brackets 65 which may be welded to the frame members 63.

Figure 4:
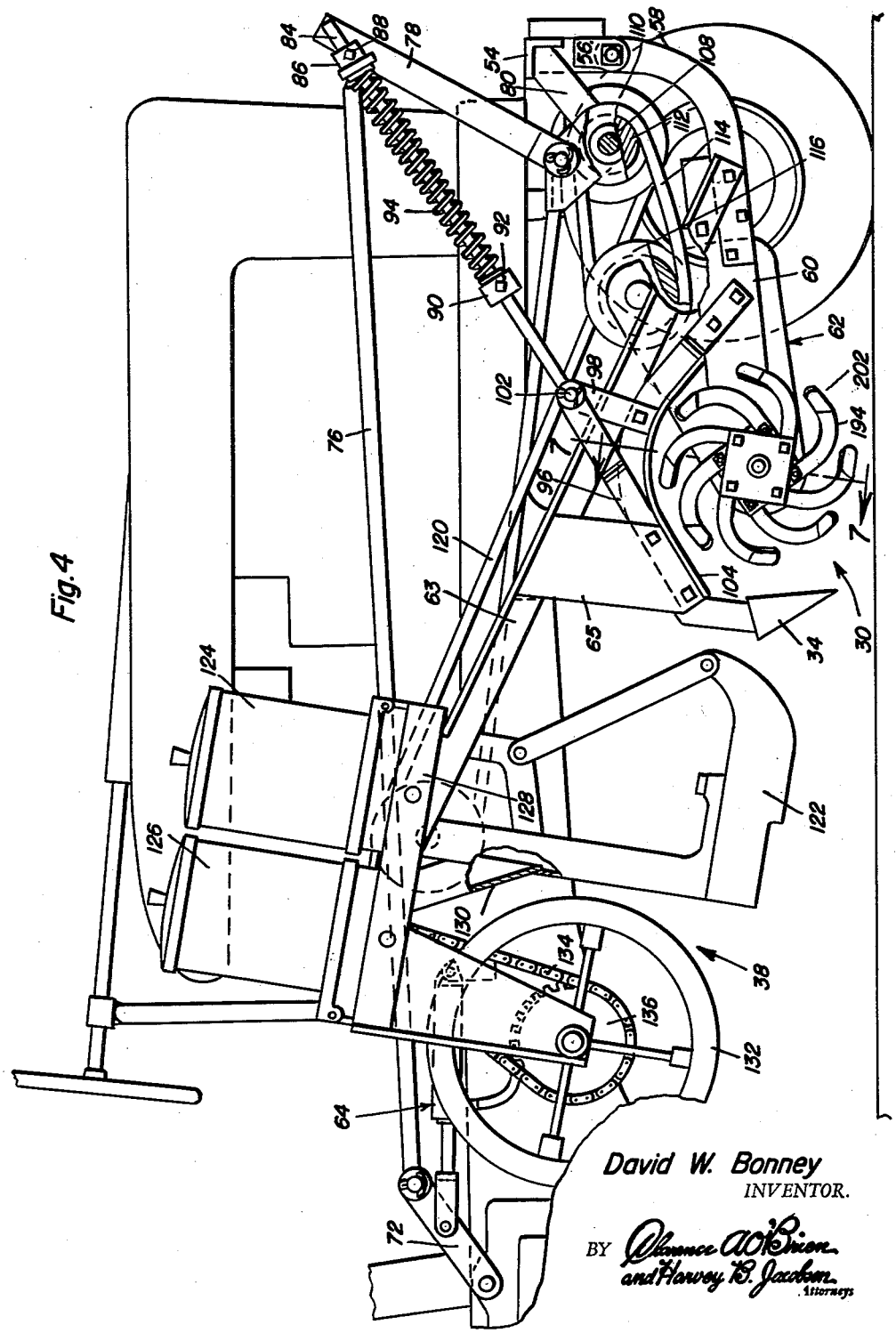
FIGURE 4 is an enlarged partial side elevational view with parts shown in section of the forward portion of the planting machine in a disengaged position.

In order to control the pivotal position of the mounting assemblies 26 and 28, there are provided a pair of hydraulic control mechanisms 64 and 66 which are under the selective control of the operator by means of a control lever 68 operative through a valve control box 70 to supply fluid under pressure to either end of the hydraulic control mechanism 64 and 66 for simultaneous or relative pivotal displacement of the lever members 72 which are pivotally mounted on the vehicle axle tube 22 on either side of the vehicle chassis frame 18 by means of bracket members 74. Connecting rod members 76 connect the lever members 72 to U-shaped positioning levers 78 pivotally connected on opposite lateral sides of the tractor vehicle as more clearly seen in FIGURE 5. As more clearly seen from FIGURE 4, the lever assemblies 78 are pivotally mounted on brackets 80 which are connected to the front cross bar member 54 and extend rearwardly therefrom. The upper portion of the lever assembly 78 as more clearly seen in FIGURE 6, have welded thereto a member 82 by means of which the connecting rod member 76 is connected to the lever assembly 78. The members 82 also constitute part of a depth control mechanism by including a pair of laterally spaced apertures which slidably receive a pair of rod members 84. Depth control collars 86 are adjustably positioned on upper ends of the rod members 84 by setscrew elements 88 while a pressure adjust collar 90 is adjustably connected to the rod member by means of setscrew elements 92 as more clearly seen in FIGURE 4. Spring elements 94 are accordingly positioned on the rod members 84 and react between the plate members 82 and the pressure adjust collars 90. The lower ends of the rod member 84 are accordingly pivotally connected to the mounting frame assemblies 26 and 28 by means of arms 96 which are bolted to the downwardly depending bracket 65 and to arms 98 which are bolted to curved members 100 fastened to the mounting frame assemblies between the lower ends of the depending bracket members 65 and the connecting plate members 60 as more clearly seen in FIGURE 4. The members 96 and 98 are accordingly pivotally connected to the lower end of the rod members 84 by pins 102 held in assembled position by cotter pins. It will also be observed, that the curved members 100 which are disposed in spaced relation to each other on opposite sides of the gear casing 62 for the spader assemblies, have connected therebelow curved shield members 104 for each of the spader assemblies. From the foregoing description, it will be apparent that by adjusting the position of the depth control collar 86 pivotal positioning of the levers 78 by means of the hydraulic control mechanisms 64 and 66 will variably determine the extent to which the mounting assemblies 26 and 28 may be positioned in order to vary the depth to which the spader assemblies 30 and 32 may penetrate the earth. Also, by adjusting the position of the pressure adjusting collar 90 on the rod members 84, the bias on the spring 94 may be varied. Referring therefore to FIGURES 1 and 4, it will be observed that FIGURE 1 illustrates the mounting assemblies in such a position under control of the hydraulic mechanism and levers 72 as to penetrate the soil with the spader assemblies. By pivotal displacement of the lever assembly 78 to a position illustrated in FIGURE 4, the hydraulic control mechanisms through the control levers 72 and connecting rods 76 may pull the mounting assemblies upwardly for pivotal displacement in a clockwise direction as viewed in FIGURE 4 so as to raise the spader assemblies out of engagement with the soil. It will also be apparent, that when the spader assemblies are engaged with the soil as illustrated in FIGURE 1, the mounting assemblies therefor may be upwardly displaced against the bias of the spring element 94 in order to prevent breakage of the spader assemblies when hard earth or rocks are engaged thereby.

Figure 5:
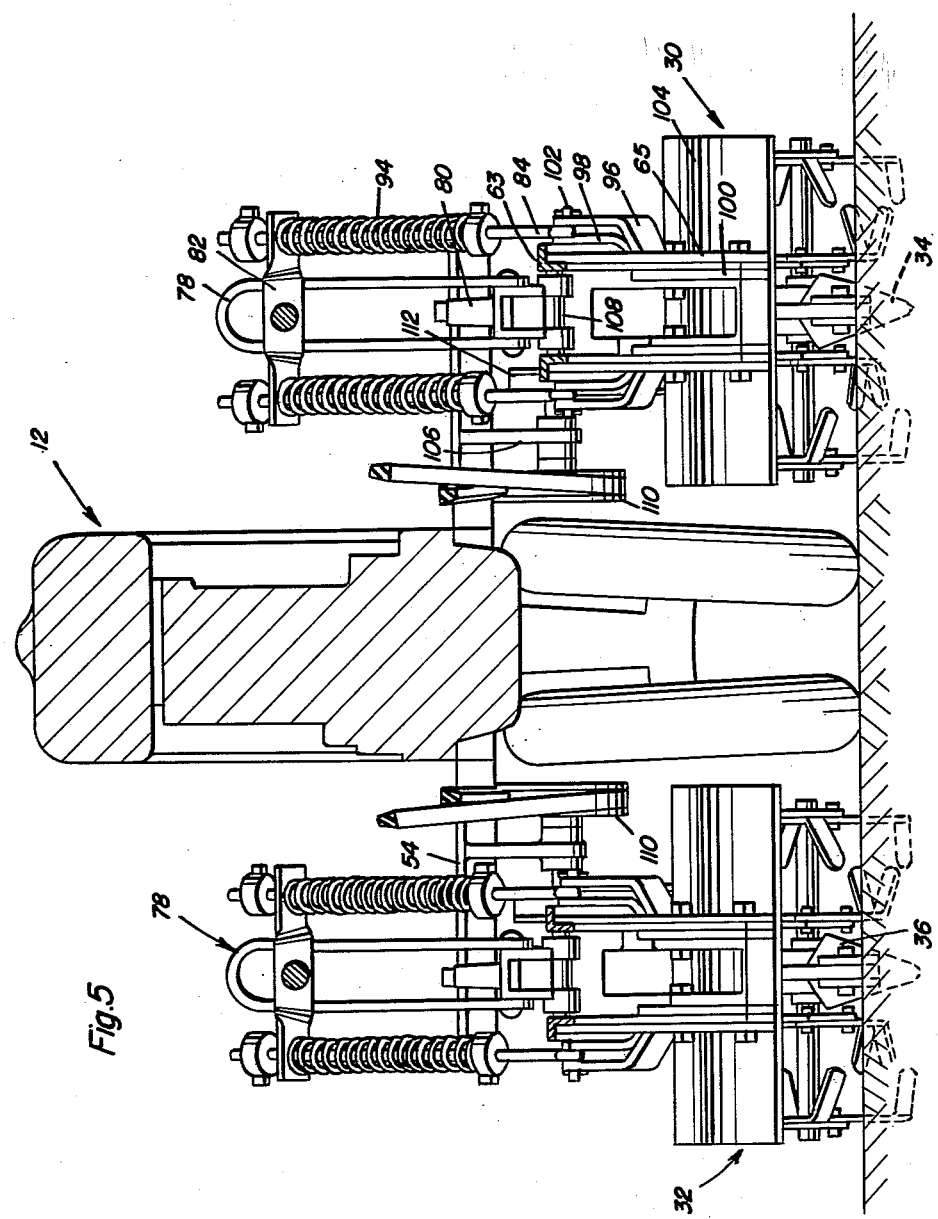
FIGURE 5 is a sectional view taken substantially through a plane indicated by section line 5—5 in FIGURE 1.

In order to impart drive to the spader assemblies 30 and 32, mounted on the mounting frames assemblies 26 and 28, journal brackets disposed in parallel spaced relation to the pivot brackets 80 for the lever assemblies 78, are also connected to the front cross bar member 54 which journal brackets are referred to by reference numerals 106 as more clearly seen in FIGURE 5. A drive shaft 108 is accordingly supported between the journal brackets 106 and 80. Fixed to the drive shaft 108, are drive pulleys 110. Fixed to the drive shaft 108 on opposite sides of the journal brackets 106 from the drive pulleys 110 are pulley wheels 112. The pulley wheels 112 are drivingly connected by short endless belts 114 to pulley wheels 116 rotatably mounted at the upper forward end of the gear casing 62 for the purpose of imparting drive to the spader assemblies. It will however be observed, that inasmuch as the gear casings 62 are mounted on the mounting assemblies 26 and 28, pivotal displacements of the mounting assembly either under selective control of the hydraulic mechanism or by the ground against the bias of the springs 94, will cause the rotational axes of the drive pulleys 116 to be displaced relative to the drive shafts 108, the axes of which are fixed with respect to the machine frame. As a result thereof, upward displacement of the mounting assemblies 26 and 28 will cause the belt 114 to slacken as illustrated in FIGURE 4. It will therefore be apparent, that drive to the spader assemblies will be discontinued when they are disengaged from the earth, which is a highly desirable feature of the present invention. The drive connection will automatically be reestablished however, when the mounting assemblies are lowered into operative position wherein the spader assemblies work the soil. The power for imparting rotation to the spader assemblies 30 and 32 is therefore derived from a power take-off pulley 118 disposed on opposite sides of the tractor vehicle and drivingly interconnected to the pulley wheels 110 by crossed belts 120.

The planter assemblies 38 and 40 which are disposed rearwardly of the plow members 34 and 36 are so arranged as to be engaged and disengaged with the earth together with the plow members and spader assemblies disposed in front thereof. The planter assemblies accordingly include a planter shoe member 122 which forms a furrow in the ground into which seeds and fertilizer are deposited from a seed planter box 124 and a fertilizer box 126. The seed and fertilizer are applied to the planter shoe 122 from a metering feed mechanism 128 which is connected to the planter shoe 122 by a delivery chute member 130. The feeding of the seeds and fertilizer in the proper quantities is therefore effected by means of a planter wheel 132 rotated by engagement with the ground for operation of the feeding mechanism 128 in a manner well known to those skilled in the art. An endless driving chain 134 is accordingly provided and is drivingly connected by a sprocket wheel 136 to the planter wheel 132 for powering the feeding mechanism 128 which is accordingly operated only when the planter wheel 132 is rotated in accordance with the speed of the vehicle.

The rear cultivating assembly portion 42 of the machine, is secured to the tractor vehicle by means of the frame assembly 50 which includes a rear cross bar 138 extending laterally beyond the vehicle and connected to the axle tube 22 by connecting members 140 and upper strap members 142. The frame assembly 52 is pivotally connected to the frame assembly 50 by means of pivot frame assemblies including rearwardly curved arm members 144 associated with each of the rear spader assemblies 44 and connected by plate members 146 bolted to the opposite sides of gear casings 62 as described with respect to the front spader assemblies 30 and 32. The rear spader assemblies 44 also include shield members 104 to which members 96 and 98 are connected as described with respect to the front spader assemblies. However, all of the rear spader assemblies 44 are interconnected by a cross bar member 148 so that all of said rear spader assemblies are simultaneously displaceable with respect to the fixed frame assembly 50.

In order to selectively control the position of the rear spader assemblies 44, a pair of hydraulic cylinder devices 150 are operatively connected thereto by means of the cross bar 148 and are under the selective control of the control lever 152 through the valve control box 154 positioned on the side of the tractor vehicle opposite the valve control box 70. The rear spader assemblies may accordingly be selectively lowered into engagement with the ground or raised therefrom.

The gear casings 62 for each of the rear spader assemblies are also provided with a drive pulley wheel 116 as described with respect to the front spader assemblies, the pulley wheels 116 are drivingly connected with a drive shaft 156 which is journalled by means of a plurality of journal brackets 158 fixed to the rear cross bar 138. A plurality of pulley wheels 160 are accordingly disposed in alignment with the pulley wheels 116 of the respective rear spader assemblies so that the drive belt 162 may be entrained about the pulley wheels 116 and 160. Inasmuch as the rear frame assembly 52 for the rear spader assemblies are pivotally mounted about an axis displaced from the drive axis of the pulley wheels 116 through the shaft 156, the belts 162 will be slackened when the rear spader assemblies are out of engagement with the ground as illustrated in FIGURE 1 and tightened for imparting drive thereto when the rear spader assemblies are in engagement with the ground. In order to impart drive to the drive shaft 156, a pulley wheel 164 is connected to the drive shaft 156 and has a drive belt 168 entrained thereabout which is also entrained about a compound idler pulley wheel assembly 170 rotatably mounted above the axle tube 22 to one lateral side of the tractor vehicle, said pulley assembly 170 being in turn drivingly connected to the power take-off pulley wheel 118 by means of a belt 172 which is entrained about the pulley assembly 170 and a second pulley wheel 174 connected to one of the power take-off pulley wheels 118 as more clearly seen in FIGURE 2. Accordingly, drive to the front and rear pulley assemblies may be simultaneously supplied by the tractor vehicle.

It will be observed that each of the rear spader assemblies 44 has associated therewith a spray nozzle mechanism 46 each of which is mounted on the shield 104 and projects thereabove and rearwardly of the rear spader assemblies for spraying therebehind. Each of the spray nozzle mechanisms 46 is accordingly connected by a flexible hose 176 to a common supply conduit 178 which in turn is connected by a hose 180 to the discharge end of a pump mechanism 182, the inlet of which is connected to the reservoir tank 48 from which weed killer and insecticide may be supplied. The pump mechanism 182 may be driven in any suitable manner from a power take-off drive 184 connected to the rear of the tractor vehicle.

Figure 7:
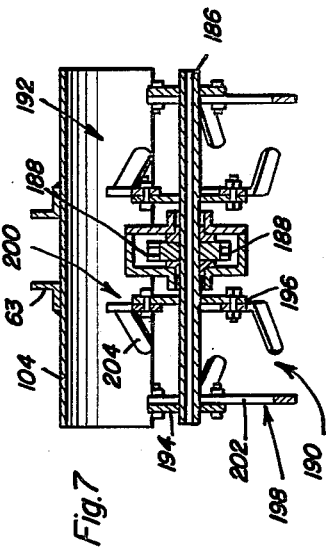
FIGURE 7 is a partial sectional view taken substantially through a plane indicated by section line 7—7 of FIGURE 4.

Each of the spader assemblies 30, 32 and 44 are of similar construction. Referring therefore to FIGURE 7 in particular, it will be observed that each of the spader assemblies includes a rotor shaft member 186 which is rotatably supported by the gear casing 62. The rotor shaft 186 accordingly extends from opposite sides of the gear casing and has connected centrally thereof a gear member 188 which is drivingly connected in any suitable manner to the drive pulley 116 for imparting rotation to the rotor shaft 186. Mounted on the rotor shaft 186 on opposite sides of the gear casing 62, are cutter blade assemblies 190 and 192 which are of similar construction. Each of the cutter blade assemblies include a pair of blade supporting disk members 194 and 196 which are angularly displaced with respect to each other and are each suitably fastened to the rotor shaft 186 as by welding. Connected to each of the disks 194 and 196, are a plurality of blade elements 198 and 200 respectively. It will be observed that the blade elements will on the respective disk members 194 and 196 be correspondingly angularly displaced with respect to each other. The blade element includes portions 202 which are disposed in a plane perpendicular to the axis of the rotor shaft 186 and are curved in a direction opposite to the direction of rotation of the rotor shaft 186 or counterclockwise as viewed in FIGURE 4, in order to assist in pulling the tractor vehicle forwardly. Each of the blade elements also includes a portion 204 which extends in an axial direction with respect to shaft 186 and at an angle to the rotational axis thereof in order to provide for progressive penetration of the earth by the blade elements. As a result thereof, the spaders will be self-sharpening and self-cleaning.

From the foregoing description, operation and utility of the planting machine will be apparent. Summarizing, however, it will be recalled that the forward mounting assemblies 26 and 28 of the planting machine have mounted thereon on the lateral sides of the tractor vehicle, pairs of spader assemblies followed by plow members 34 and 36 and then by planter assemblies 38 and 40. Accordingly, two rows are spaded, cultivated, and seeded as well as fertilized in one operation. It will be further apparent, that the spader assemblies 30 and 32 are adjustably mounted for accommodating the irregularities of the earth and may be selectively adjusted as to depth with respect to each other for terracing purposes. Also, following the tilling, seeding and fertilizing operations, the earth may be additionally worked over by means of the rear spader assemblies which are so positioned with respect to the front spader assemblies as to till the earth between the crop rows and remove the tractor wheel tracks. In addition thereto weed killer and insecticide may be applied. It will therefore be appreciated, that the planter machine will in one operation properly condition the soil and seed leaving a smooth and fine seed bed and may also be selectively operated for hill terracing purposes. Also, operation may be effected with minimum use of power, without breakdown, smoothly and consequently with a savings in time, labor and expense.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combined planting machine adapted to be mounted on a tractor vehicle having rear traction wheels and front steering wheels, comprising, laterally spaced front spader means mounted between the front and rear wheels of the vehicle and in a lateral direction with respect thereto, each spader means including two blade assemblies spaced from each other and mounted on a rotor shaft for rotation therewith, each blade assembly consisting of a mounting disc, a plurality of blade members mounted at peripherally spaced points on the disc and projecting radially therefrom, each blade member being curved in a direction opposite to the direction of rotation of the rotor shaft in a plane perpendicular to the shaft, the outer portion of each blade member projecting axially with respect to the shaft and inclined at an angle thereto for progressive penetration of the earth, the outer portions of the two blade assemblies of each spader means extending inwardly toward each other, drive means connected to the rotor shaft for effecting the rotation thereof in a direction so as to first engage the blade members with the soil forward of the rotor shaft along the line of travel, thus tending to propel the vehicle forwardly, the soil being pulverized and discharged rearwardly, a forwardly and downwardly orientated earth engaging plow means mounted directly behind the spader means and in line with the space between the two blade assemblies, whereby the soil between the two rows of pulverized soil is split and turned over onto the pulverized soil thus forming a trench for the reception of seed, planter means in line with and directly behind each of the plow means, said planter means comprising a forward furrow forming portion and a rear seed and fertilizer dispensing portion, a seed box and a fertilizer box positioned over each planter means, a metering feed mechanism mounted between the boxes and the dispensing portion of the planter means for regulation of the dispensing of the feed and fertilizer, and means for activating said feed mechanism comprising a wheel rotatable by engagement with the ground upon forward movement of the planting machine, said wheel mounted directly behind the planter and in contact with the ground when the planting machine is in its normal operating position, frame means pivotally secured to the tractor vehicle, said spader means, plow means, planter means and rotatable wheel being rigidly secured in fixed relation to each other to the frame means rearward of the pivotal connection of the frame means to the tractor vehicle, means biasing said frame means rearwardly and downwardly so as to engage the attached means with the ground, said biasing means being such so as to allow an upward pivoting of frame means upon the spader means encountering a resistance sufficient so as to resist penetration of the spader means, said plow means, planter means and rotatable wheel being immediately and simultaneously disengaged from the soil upon the aforementioned upward pivoting of the frame means resulting from the encountering of a resistance by the spader means, the drive means connected to the rotor shaft being automatically operatively disengaged from the spader means upon the raising of the spader means out of contact with the ground.

2. The combination of claim 1 including laterally spaced rear spader means mounted in laterally overlapping relation to the front spader means for continuous wide swath tilling in combination with the front spader means.

References Cited in the file of this patent

UNITED STATES PATENTS

| | | |
|---|---|---|
| 852,777 | Dudley | May 7, 1907 |
| 1,556,643 | Spraggins | Oct. 13, 1925 |
| 2,318,205 | Drennan | May 4, 1943 |
| 2,361,798 | Smith | Oct. 31, 1944 |
| 2,375,850 | Johnson | May 15, 1945 |
| 2,430,597 | Acton | Nov. 11, 1947 |
| 2,556,072 | Dewey | June 5, 1951 |
| 2,659,447 | Wetmore | Nov. 17, 1953 |
| 2,684,022 | Smithburn | July 20, 1954 |
| 2,793,576 | Corpi | May 28, 1957 |

FOREIGN PATENTS

| | | |
|---|---|---|
| 205,273 | Austria | Sept. 10, 1959 |
| 200,858 | Great Britain | July 23, 1923 |
| 672,719 | Great Britain | May 28, 1952 |